(12) United States Patent
Errick et al.

(10) Patent No.: US 9,500,092 B2
(45) Date of Patent: Nov. 22, 2016

(54) AIR DUCT ASSEMBLY HAVING A FLEXIBLE VANE

(71) Applicant: Ford Global Technologies, LLC, Dearborn, MI (US)

(72) Inventors: Steven David Errick, Royal Oak, MI (US); Paul Bryan Hoke, Plymouth, MI (US); James R. Hurd, Canton, MI (US); Eric R. Yerke, Redford, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 820 days.

(21) Appl. No.: 13/856,518

(22) Filed: Apr. 4, 2013

(65) Prior Publication Data

US 2014/0301832 A1 Oct. 9, 2014

(51) Int. Cl.
| | | |
|---|---|---|
| *B60H 1/34* | (2006.01) | |
| *F01D 9/02* | (2006.01) | |
| *F24F 13/02* | (2006.01) | |
| *F24F 13/14* | (2006.01) | |

(52) U.S. Cl.
CPC ............... *F01D 9/02* (2013.01); *B60H 1/345* (2013.01); *B60H 1/3407* (2013.01); *F24F 13/0209* (2013.01); *F24F 2013/1493* (2013.01)

(58) Field of Classification Search
CPC ........... F01D 9/02; F24F 13/08; B60H 1/345
USPC ........................................... 454/155
See application file for complete search history.

(56) References Cited

U.S. PATENT DOCUMENTS

| | | | |
|---|---|---|---|
| 4,437,392 A | | 3/1984 | Stouffer |
| 5,238,448 A | * | 8/1993 | Komori ............... B60H 1/3421 454/155 |
| 6,902,474 B2 | | 6/2005 | Gehring et al. |
| 7,556,559 B2 | * | 7/2009 | Rivera ................ B60H 1/249 137/855 |
| 8,757,156 B2 | * | 6/2014 | Martin .................. A62B 18/10 128/205.27 |

FOREIGN PATENT DOCUMENTS

EP 2228243 B1 9/2011

* cited by examiner

*Primary Examiner* — Helena Kosanovic
(74) *Attorney, Agent, or Firm* — Raymond L. Coppiellie; Brooks Kushman P.C.

(57) ABSTRACT

An air duct assembly having a housing and a flexible vane. Sufficient airflow through the housing may actuate the flexible vane to permit airflow through an outlet.

20 Claims, 2 Drawing Sheets

AIR DUCT ASSEMBLY HAVING A FLEXIBLE VANE

TECHNICAL FIELD

This patent application relates to an air duct assembly having a flexible vane.

BACKGROUND

An airflow system with an oscillating reed is disclosed in U.S. Pat. No. 4,437,392.

SUMMARY

In at least one embodiment, an air duct assembly is provided. The air duct assembly may include a housing and a flexible vane. The housing may have first and second walls that may at least partially define an outlet. The flexible vane may be disposed on the second wall. Sufficient airflow through the housing may actuate the flexible vane to disengage the first wall and permit airflow through the outlet.

In at least one embodiment, an air duct assembly is provided. The air duct assembly may include a housing and a flexible vane. The housing may have first and second walls that may at least partially define an outlet. The flexible vane may be fixedly disposed within the housing on the second wall. Airflow may actuate the flexible vane from a closed position in which the flexible vane blocks airflow through the outlet to an open position in which the flexible vane is spaced apart from the second wall to permit airflow through the outlet.

In at least one embodiment, an air duct assembly is provided. The air duct assembly may include a housing and a flexible vane. The housing may have a first outlet disposed between first and second walls. The flexible vane may be fixedly disposed on the second wall. Airflow may move the flexible vane from a closed position in which the flexible vane engages the first wall to inhibit airflow through the first outlet to an open position in which the flexible vane is spaced apart from the second wall to permit airflow through the first outlet.

DETAILED DESCRIPTION

As required, detailed embodiments of the present invention are disclosed herein; however, it is to be understood that the disclosed embodiments are merely exemplary of the invention that may be embodied in various and alternative forms. The figures are not necessarily to scale; some features may be exaggerated or minimized to show details of particular components. Therefore, specific structural and functional details disclosed herein are not to be interpreted as limiting, but merely as a representative basis for teaching one skilled in the art to variously employ the present invention.

Figure 1:
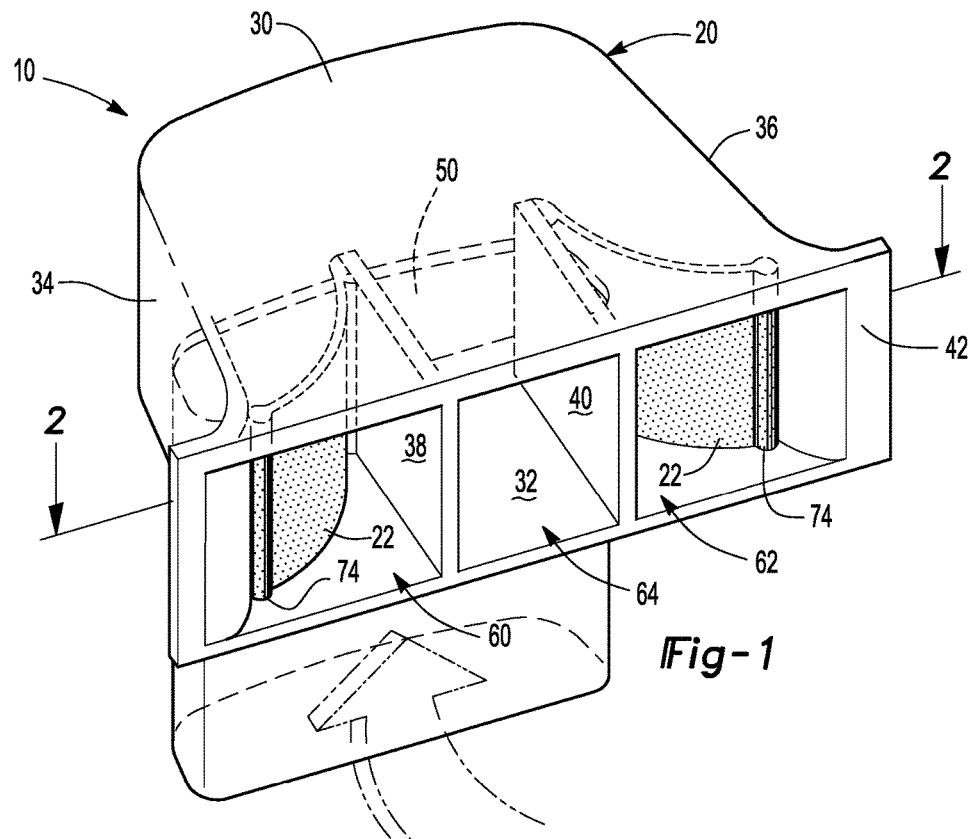
FIG. 1 is a perspective view of an air duct assembly.

Referring to FIG. 1, an air duct assembly 10 is shown. The air duct assembly 10 may be provided with a heating, ventilation and air conditioning system (HVAC) for a vehicle, such as a motor vehicle like a car or truck.

The air duct assembly 10 may be configured to control and/or direct the flow of air within a passenger compartment of the vehicle and may be located at any suitable location downstream of a blower fan that may blow air through the HVAC system. For instance, the air duct assembly 10 may be provided with an interior trim component such as an instrument panel, door panel, trim panel, console unit, headliner, or the like. As such, the air duct assembly 10 may replace or may be used in lieu of stationary registers or moveable louvers that may be manually or electrically actuated to direct airflow toward a particular direction of the passenger compartment. Alternatively, the air duct assembly 10 may be configured to control and/or direct the flow of air within a plenum of the HVAC system and may be spaced apart from and output or outlet of an air duct.

Figure 2:
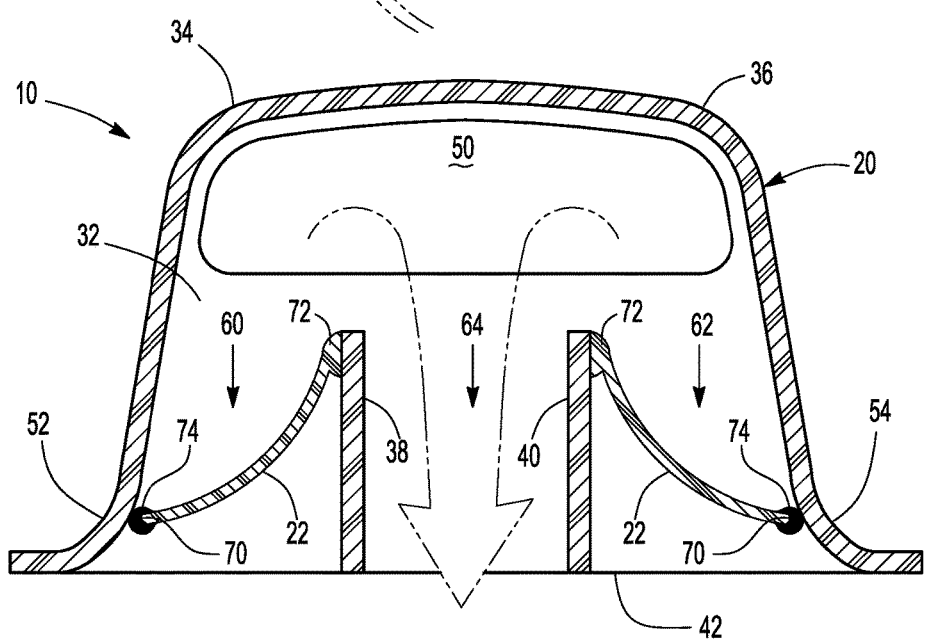
FIG. 2 is a section view of the air duct assembly along section line 2-2 illustrating flexible vanes in a closed position.
Figure 3:
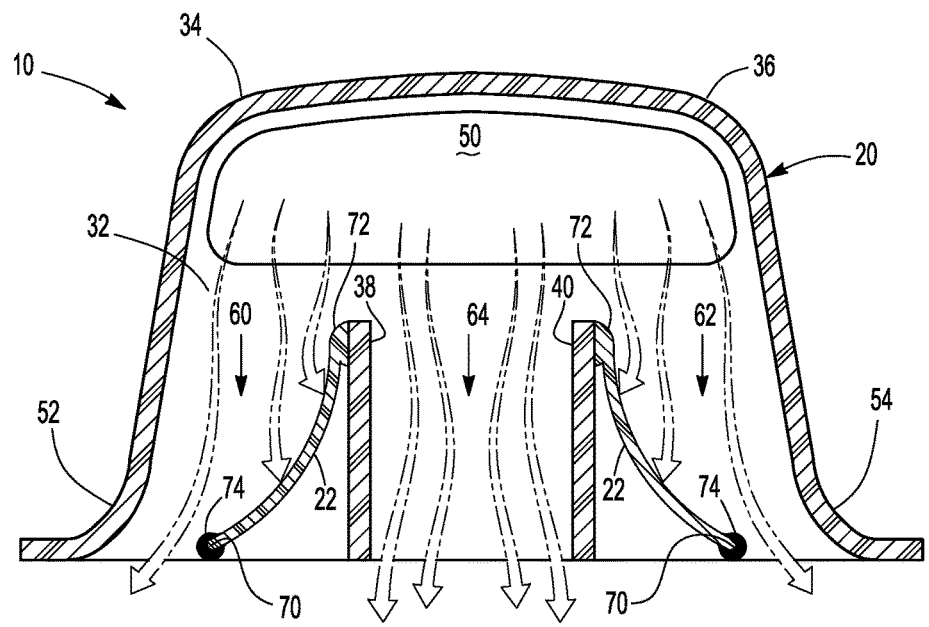
FIG. 3 is a section view of the air duct assembly illustrating flexible vanes in an open position.

Referring to FIGS. 1-3, the air duct assembly 10 may include a duct or housing 20 and at least one flexible vane 22.

The housing 20 may be configured to receive and direct the flow of air. The housing 20 may be made of any suitable material, such as a polymeric material like polypropylene. In at least one embodiment, the housing 20 may include a first panel 30, a second panel 32, a first wall 34, a second wall 36, a third wall 38, a fourth wall 40, and a front side 42. One or more walls or panels may be omitted in various embodiments.

The first and second panels 30, 32 may help provide a structure of the housing 20. The first and second panels 30, 32 may be spaced apart from each other and/or may be disposed substantially parallel to each other in one or more embodiments. The first panel 30 and/or second panel 32 may be disposed proximate an air inlet 50 that may receive air that may be propelled or blown through the HVAC system by the blower fan. As is best shown in FIG. 2, the air inlet 50 may be disposed within a panel, such as the second panel 32. Alternatively, the air inlet 50 may be disposed proximate the first panel 30 and/or one or more walls of the housing 20.

The first and second walls 34, 36 may be disposed proximate the first and second panels 30, 32. For example, the first and second walls 34, 36 may extend from the first panel 30 to the second panel 32. The first and second walls 34, 36 may form an exterior surface of the housing 20 and may or may not be spaced apart from each other. For example, in FIG. 2 the first and second walls 34, 36 extend from each other to a front side 42 of the housing 20. The first and second walls 34, 36 may at least partially define an outlet of the housing 20 as will be discussed in more detail below.

At least a portion of the first and/or second walls 34 36 may have a nonlinear configuration. For example, the first wall 34 may have a curved portion 54 that may be disposed proximate the front side 42 of the housing 20 and that may extend along an arc or parabolic curve. Similarly, the second wall 36 may have a curved portion 56 that may be disposed proximate the front side 42 and that may also extend along an arc or parabolic curve. As such, the curved portion 54 of the first wall 34 may extend away from the curved portion 56 of the second wall 36 near the front side 42 of the housing 20 in one or more embodiments. The curved portions 54, 56 may help direct air toward different passenger compartment occupants or direct air from different housing outlets in different directions as will be discussed in more detail below.

The third and fourth walls 38, 40 may be disposed proximate the first and second panels 30, 32. For example, the third and fourth walls 38, 40 may extend from the first panel 30 to the second panel 32. The third and fourth walls 38, 40 may be spaced apart from the first and second walls 34, 36 and may extend substantially parallel to each other in one or more embodiments. In addition, the third and fourth walls 38, 40 may extend from the front side 42 of the housing 20 toward the air inlet 50 and facilitate mounting of a flexible vane 22 as will be discussed in more detail below.

The housing 20 may include one or more air outlets through which air may exit. In FIG. 1, a first outlet 60, a second outlet 62, and a third outlet 64 are shown. A different number of outlets or different outlet configurations may be provided in one or more embodiments.

The first outlet 60 may be disposed proximate the front side 42 of the housing 20. The first outlet 60 may be at least partially defined by the first panel 30, second panel 32, first wall 34, and third wall 38.

The second outlet 62 may be spaced apart from the first outlet 60 and may be disposed proximate the front side 42 of the housing 20. The second outlet 62 may be at least partially defined by the first panel 30, second panel 32, second wall 36, and fourth wall 40.

The third outlet 64 may be disposed between the first outlet 60 and the second outlet 62 and may be disposed proximate the front side 42 of the housing 20. The third outlet 64 may be at least partially defined by the first panel 30, second panel 32, third wall 38, and fourth wall 40. The third outlet 64 may have a greater cross-sectional area than the first outlet 60 and the second outlet 62. In addition, a flexible vane 22 may not be provided with the third outlet 64 in one or more embodiments.

A flexible vane 22 may be provided to control airflow through the housing 20 and one or more outlets. In the embodiment shown, a flexible vane 22 is provided in the first outlet 60 and the second outlet 62. The flexible vane 22 may have a unitary or one-piece construction and may be configured to flex or move in response to sufficient airflow or sufficient force exerted by air flowing through the housing 20 as will be discussed in more detail below.

The flexible vane 22 may have a first end 70 and a second end 72. The first end 70 may be detached from the housing 20. The second end 72 may be disposed opposite the first end 70 and may fixedly disposed on or with respect to the housing 20. For example, the second end 72 may be fixedly disposed on the second wall 36 or the fourth wall 40 in one or more embodiments. In addition, the second end 72 may be disposed within the housing 20 such that it is spaced apart from the front side 42. The second end 72 may be fixedly disposed on the housing 20 in any suitable manner, such as by ultrasonic welding, vibration welding, heat staking, with an adhesive, or with one or more fasteners.

The flexible vane 22 may have a non-linear configuration to help direct airflow in a desired manner or direction and to facilitate movement. For example, the flexible vane 22 may extend along a curve or arc from the first end 70 toward or to the second end 72. The curvature of the flexible vane 22 may change when the flexible vane 22 flexes or moves in response to force exerted by air that engages a surface of the flexible vane 22 that faces toward the air inlet 50.

Optionally, a seal 74 may be provided with the flexible vane 22 to inhibit air leakage between the housing 20 and the flexible vane 22. For example, a seal 74 may be provided at the first end 70 and may be configured to engage the first wall 34 or second wall 36 near the front side 42 of the housing 20 or along a corresponding curved portion 54, 56. The seal 74 may also extend around additional surfaces of the flexible vane 22 and may engage the first panel 30 and/or the second panel 32 in one or more embodiments. The seal 74 may be made of any suitable material, such as a resilient material like rubber. In addition, the seal 74 may be overmolded onto the flexible vane 22 and may have a different durometer than the portion of the flexible vane 22 to which is it attached.

The flexible vane 22 may be configured to flex or move between a closed position and an open position. In FIG. 2, the flexible vanes 22 are shown in the closed position. In the closed position the flexible vane 22 may engage the housing 20 to inhibit airflow through an associated outlet. For example, the flexible vane 22 in the first outlet 60 may have a first end 70 that engages the first wall 34 along an interior surface or surface that faces toward the third wall 38. Similarly, the flexible vane 22 in the second outlet 62 may have a first end 70 that engages the second wall 36 along an interior surface or surface that faces toward the fourth wall 40. The configuration of the flexible vane 22 may bias the flexible vane 22 toward the closed position in the absence of sufficient force to actuate the flexible vane 22 toward the open position.

In FIG. 3, the flexible vanes 22 are shown in the open position. In the open position the first end 70 of the flexible vane 22 may be spaced apart from the housing 20 to permit airflow through an associated outlet. For example, the flexible vane 22 in the first outlet 60 may have a first end 70 that may be spaced apart from and disposed between the first and third walls 34, 38 when in the open position. Similarly, the flexible vane 22 disposed in the second outlet 62 may have a first end 70 that may be spaced apart from and disposed between the second and fourth walls 36, 40 when in the open position. The flexible vane 22 in the first outlet 60 and the flexible vane 22 in the second outlet may extend in opposite directions or may have first ends 70 that extend in opposing directions to direct airflow exiting from the first outlet 60 away from airflow exiting the second outlet 62. In addition, the flexible vane 22 in the first outlet 60 and the flexible vane 22 in the second outlet may move together or simultaneously between the open and closed positions at substantially the same time.

The flexible vane 22 may move from the closed position to the open position in response to force exerted by air flowing through the housing 20. More specifically, air that is provided to the housing 20 under pressure may exert force on the flexible vane 22. The flexible vane 22 may flex or move such that the first end 70 of the flexible vane 22 disengages the housing 20 when sufficient airflow is provided or sufficient force is exerted by the mass airflow against the flexible vane 22. As such, air provided through the air inlet 50 may be directed toward the first and second outlets 60, 62 and may exert sufficient force to actuate a corresponding flexible vane 22 to permit airflow through an associated outlet 60, 62.

The air duct assembly 10 may be configured to direct air toward a vehicle occupant in the open position and not direct air toward a vehicle occupant in the closed position. For example, the curvature of the first wall 34 and flexible vane 22 in the first outlet 60 may direct air generally to the left from the perspective shown in FIG. 3. Similarly, the curvature of the second wall 36 and flexible vane 22 in the second outlet 62 may direct air generally to the right from the perspective shown in FIG. 3. As such, the configuration shown may direct air toward left and right vehicle seating positions when disposed between laterally spaced seating positions, such as near the center line of the vehicle or at a center stack of the instrument panel. The third outlet 64 may allow air to pass toward other seating positions or toward the rear of the passenger compartment.

The flexible vanes 22 may be actuated solely by mass airflow and without manual actuation, user input, or an electrical actuator. As such, the air duct assembly 10 may replace or may be used without expensive register events or louvers. Moreover, the flexible vanes 22 may allow air to be automatically directed toward a vehicle occupant as a function of mass airflow. The amount of air or mass airflow may be controlled by the blower fan. For example, higher blower fan rotational speeds may increase the mass airflow through the housing 20 to actuate the flexible vane 22. As such, the flexible vane 22 may open at higher blower fan speeds and may close at lower blower fan speeds. Higher blower fan speeds may be used to help cool a vehicle occupant. For instance, higher blower fan speeds may be used in a "max A/C" mode to increase the mass airflow through a heat exchanger such as an evaporator. The air exiting the evaporator may then open a flexible vane 22 and be directed toward a vehicle occupant as previously described. Blower fan speed may be manually or automatically decreased when the passenger compartment has been sufficiently cooled, or a lower blower fan speed is requested. The decrease in blower fan speed may reduce the force exerted by air upon the flexible vane 22 and allow the flexible vane 22 to move to the closed position. As a result, cold air may no longer be directed directly toward a vehicle occupant, which may improve occupant comfort.

While exemplary embodiments are described above, it is not intended that these embodiments describe all possible forms of the invention. Rather, the words used in the specification are words of description rather than limitation, and it is understood that various changes may be made without departing from the spirit and scope of the invention. Additionally, the features of various implementing embodiments may be combined to form further embodiments of the invention.

What is claimed is:

1. An air duct assembly comprising:
   first, second, third and fourth walls extending from first and second panels, the first and third walls partially defining a first outlet, second and fourth walls partially defining a second outlet, and third and fourth walls partially defining a third outlet; and
   first and second flexible vanes fixedly disposed on the third and fourth walls, respectively, that disengage the first and second walls, respectively, to permit airflow through the first and second outlets;
   wherein sufficient airflow through a housing actuates the first and the second flexible vanes to permit airflow through the first and the second outlets, and wherein a vane is not provided with the third outlet.

2. The air duct assembly of claim 1 wherein the first flexible vane engages the first wall when there is insufficient airflow to actuate the first flexible vane.

3. The air duct assembly of claim 1 wherein the first wall is disposed opposite the second wall.

4. The air duct assembly of claim 1 wherein the first flexible vane has a first end and a second end disposed opposite the first end, wherein the first end engages the first wall when there is insufficient airflow to actuate the first flexible vane.

5. The air duct assembly of claim 4 wherein the second end is fixedly disposed on the third wall.

6. The air duct assembly of claim 4 wherein the first wall extends along an arc.

7. The air duct assembly of claim 6 wherein the first end engages the arc when the first flexible vane is in a closed position.

8. The air duct assembly of claim 1 wherein the first and second walls engage each other but do not engage the third and fourth walls and the third and fourth walls do not engage each other.

9. An air duct assembly comprising:
   a housing having a first outlet defined between first and third walls, a second outlet defined between second and fourth walls, and a third outlet defined between third and fourth walls; and
   first and second vanes fixedly disposed on the third and fourth walls, respectively, that disengage the first and second walls, respectively, when actuated by airflow to open positions, wherein a vane is not provided with the third outlet.

10. The air duct assembly of claim 9 wherein the first vane has a first end and a second end disposed opposite the first end, wherein the first end is spaced apart from the first wall when the first vane is in the open position.

11. The air duct assembly of claim 10 wherein the first vane further comprises a seal disposed at the first end that engages the first wall when the first vane is in a closed position.

12. The air duct assembly of claim 10 wherein the first end is disposed between and spaced apart from the first and third walls in the open position.

13. The air duct assembly of claim 10 wherein the housing has a front surface that extends around the first outlet, wherein the first end of the first vane is disposed closer to the front surface than the second end.

14. An air duct assembly comprising:
   a housing having a first outlet disposed between first and third walls, a second outlet at least partially defined by second and fourth walls, and a third outlet disposed between the first and second outlets;
   a first flexible vane fixedly disposed on the third wall; and
   a second flexible vane disposed on the fourth wall;
   wherein airflow moves the first flexible vane from a closed position in which the first flexible vane engages the first wall to inhibit airflow through the first outlet to an open position in which the first flexible vane is spaced apart from the first wall to permit airflow through the first outlet, and the second flexible vane moves between a closed position in which the second flexible vane engages the second wall to inhibit airflow through the second outlet and an open position in which the second flexible vane is spaced apart from the second wall to permit airflow through the second outlet, wherein a flexible vane is not provided in the third outlet.

15. The air duct assembly of claim 14 wherein the first wall, second wall, third wall, and fourth wall extend from a first panel to a second panel of the housing.

16. The air duct assembly of claim 14 wherein the first and second flexible vanes each extend along an arc and extend in opposite directions from each other.

17. The air duct assembly of claim 14 wherein the first and second flexible vanes move simultaneously between the open and closed positions.

18. The air duct assembly of claim 15 further comprising an inlet that is completely defined in the first panel and the third wall and the fourth wall do not engage each other or the first wall and the second wall.

19. The air duct assembly of claim 18 wherein air flows through the third outlet when the first and second flexible vanes are in the closed position.

20. The air duct assembly of claim 18 wherein the third outlet is at least partially defined by the third and fourth walls.

\* \* \* \* \*